United States Patent [19]
Vick

[11] Patent Number: 5,190,402
[45] Date of Patent: Mar. 2, 1993

[54] FIRE RESISTANT CONNECTOR FOR OIL CONTAINMENT BOOMS

[75] Inventor: Robert L. Vick, Woodbury, Minn.

[73] Assignee: Minnesota Mining and Manufacturing Company, St. Paul, Minn.

[21] Appl. No.: 798,653

[22] Filed: Nov. 26, 1991

[51] Int. Cl.$^5$ ............................................. E02B 15/04
[52] U.S. Cl. ...................................... 405/70; 405/63; 405/71
[58] Field of Search .................................. 405/63-72; 403/341, 393, 339; 256/23, 1

[56] References Cited

U.S. PATENT DOCUMENTS

| | | |
|---|---|---|
| 3,848,417 | 11/1974 | Smith et al. |
| 4,030,304 | 6/1977 | West ................................ 405/70 |
| 4,155,664 | 5/1979 | Acheson ........................ 403/317 |
| 4,295,756 | 10/1981 | Blair ............................ 405/72 X |
| 4,367,979 | 1/1983 | Milligan ........................ 405/70 |
| 4,375,779 | 3/1983 | Fischer ............................ 87/6 |
| 4,507,017 | 3/1985 | Magoon ........................ 405/66 |
| 4,619,553 | 10/1986 | Fischer ........................ 405/63 |
| 4,781,493 | 11/1988 | Fischer ........................ 405/63 |
| 4,802,791 | 2/1989 | Fisher et al. ................ 405/63 |
| 4,923,332 | 5/1990 | Sanocki et al. ............ 405/63 |

FOREIGN PATENT DOCUMENTS 1175242 10/1984 Canada .

OTHER PUBLICATIONS

Brochure entitled "3M Fire Boom;" one page, double sided; published by Minnesota Mining and Manufacturing Company of St. Paul, Minn. relating to the construction of oil containment booms.
Brochure entitled "3M Fire Boom: An Integral Tool For Oil Spill Management;" three pages, double sided; published by Minnesota Mining and Manufacturing Company of St. Paul, Minn. relating to oil containment and burning.
"1991 World Catalog of Oil Spill Response Products," 3rd ed., by Robert Schultze Environmental Consultant, Inc., (21 pages).

Primary Examiner—Dennis L. Taylor
Attorney, Agent, or Firm—Gary L. Griswold; Walter N. Kirn; Peter L. Olson

[57] ABSTRACT

The present invention relates to a fire resistant boom connector for connecting adjacent oil containment booms. The boom connector includes cooperating connector portions, each of which include a base portion, an elbow portion, and a engaging portion. A slot bounded by the base portion, the elbow portion, and the engaging portion is adapted for receipt of a cooperative engaging portion to interengage the connector portions.

18 Claims, 3 Drawing Sheets

FIRE RESISTANT CONNECTOR FOR OIL CONTAINMENT BOOMS

TECHNICAL FIELD

This relates to a connector, and more specifically to a fire resistant connector for joining oil containment booms.

BACKGROUND OF THE INVENTION

Oil and petroleum products are stored and transported around the world for use in a variety of applications. Enormous pipelines and sea-going supertankers transfer millions of gallons of oil across the world, and one hazard of such large scale operations is the risk that oil or oil products will be spilled in or near water. As a result, containment and clean up measures have been developed in order to minimize or prevent the potentially catastrophic environmental damage that can result from an oil spill in a body of water.

Because oil has a lower specific weight than either fresh or salt water, it tends to float atop the water. Although oil floats in one or more large pools when the surrounding water is calm, ambient disturbances such as wind, rain, or waves cause the oil to diffuse over a much larger area of the surface of the water. Oil may also be spilled into rivers or other waterways, and may disperse quickly downstream. Thus it is critical to contain or stop the movement of the oil as quickly as possible, before it is allowed to diffuse, in order to facilitate removal.

Oil is typically contained by deploying buoyant oil containment booms, which are well known in the art. Exemplary of such oil containment booms is U.S. Pat. No. 4,781,493 (Fischer). As shown in FIG. 1, boom 10 is positively buoyant and extends both above and below the surface of the water 12 to prevent oil 14 from passing from first side 16 to second side 18 of boom 10. Float 20 is generally cylindrical, and a portion thereof extends above the surface of the water. Float 20 typically measures from 20 cm. to 46 cm. in diameter, and includes a central flotation core 21 surrounded by layers of fire resistant material 23, 25, and 27. The boom may also be covered by a polymeric outer layer 29 for aesthetic reasons. At least some of these layers are drawn together over an end of the flotation core to form a boom flap (represented in FIG. 5 by a single layer boom flap 131) at the end of the boom.

Skirt 22, which prevents oil 14 from escaping beneath float 20, extends downwardly from the bottom of the float. The skirt may measure on the order of 43 cm. to 92 cm., and thus the total height of the oil containment boom is typically from 63 cm. to 138 cm. Lower tension member 24 is weighted, and is attached to the bottom of skirt 22 to maintain boom 10 in the desired upright position. Boom 10 is generally flexible, in order to withstand the stresses applied by the surrounding water and waves, and to aid in encircling an oil spill.

Oil containment booms typically measure on the order of 3 meters to 15 meters long, and a plurality of booms are often connected together to form a string, which may measure in excess of 150 meters long. In order to construct the string, boom connectors are used to connect adjacent booms, and each boom connector preferably extends from the top of the booms to the bottom of the underwater skirt. The height of the boom connector is thus approximately equal to the height of the containment booms. An important consideration in the design and use of an oil containment boom connector is that the boom connector minimize, or preferably prevent the flow of oil through the boom connector from the surrounded area to the open water. This becomes particularly important when the contained oil is aflame because of the danger to the surroundings and to workers should the burning oil escape.

One known boom connector, sold by Minnesota Mining and Manufacturing Company of St. Paul, Minn., includes two parallel plate members which are joined in a face to face relationship. A similar connector is shown in FIG. 1.22(g) on page 36 of the 1991 World Catalog of Oil Spill Response Products, (3d ed.), by Robert Schultze Environmental Consultant, Inc., 6154 Rockburn Hill Road, Elkridge, Md. 21227. The first plate member typically has a peg or bolt located at the bottom that engages a slot on the bottom of the second, opposed plate member. A fastener is then inserted through a hole at the top of each of the plate members to secure the boom connector. Such connectors may develop gaps between the plate members, especially when large towing loads are applied, and the gaps may allow oil to leak from the surrounded area. It is therefore desirable to provide a boom connector that provides a more effective barrier to the passage of oil therethrough.

Another consideration related to the construction of interlocking connector portions is ease of assembly. Oil boom connectors are often manually interengaged while they are attached to booms that are in the water. Furthermore, darkness, cold, and the presence of oil each complicate the process of interengaging the boom connector to connect the oil booms together. Thus connections which require multiple manual manipulations are undesirable, and a quick-release feature is also preferable in order to minimize the effort required to disconnect the boom connector.

Boom connectors having small clearances between interengaging members are generally undesirable, because of the increased difficulty in aligning and engaging adjacent parts. The boom connectors shown in U.S. Pat. Nos. 4,295,756 (Blair) and 4,367,979 (Milligan) are representative of boom connectors that have cooperative connector portions, each portion having a channel portion and a securing portion. The securing portion of one connector portion is inserted in the channel portion of the other connector portion, and vice versa, to interengage the connector. The clearance between the respective channels and securing portions is small, which can make interengagement difficult. For example, oil booms may be used under arctic conditions, where ice can build up within the channels into which the securing portions are to be inserted, possibly preventing interengagement of the connector portions. Thus, in order to connect the oil booms, an operator would have to lift the end of each oil boom completely out of the water, remove the ice from the entire length of the channels, and again attempt to interengage the connector portions. Thus from the standpoint of interengaging the portions of an oil boom connector, small clearances are undesirable.

Once a string of booms has been assembled, a pair of boats each pull one end of the string across the water, which collects oil in the end of the U-shaped string, as shown in FIG. 2. Thus a boom connector must be strong enough to withstand the drag force applied by the water on the booms during towing. Once a quantity of oil has been accumulated within the area surrounded by the string of booms, there are numerous methods of collecting or disposing of the oil. For example, a surfactant may be added to the oil to disperse it, or the oil may be skimmed from the surface of the water. A relatively recent innovation involves burning the oil as it floats on the surface of the water. Under suitable circumstances, 95-98% of the oil can be burned away, after which the residue may be collected from the surface of the water. In order to begin and to sustain an oil fire atop a body of water, the oil must be greater than 1 millimeter thick, and preferably about 2.5 millimeters thick. In practice, the best way to collect the oil, and thus to sustain the fire is to tow a string of oil containment booms through an area where oil has settled on the water. As the oil collects against the U-shaped end of the string it is set aflame, and the continued addition of oil fuels the fire.

When oil is burned, the temperatures are typically in the range of 650°-865° C., and may reach 1100° C. Some boom connectors are inadequate for use with oil burning, because at least some of the materials of which they are made, such as aluminum, deteriorate at temperatures well below that of burning oil. In some cases, the boom connector melts down to the surface of the water, which allows oil to wash over the top of the boom connector and escape the surrounded area. The oil boom connectors presented in U.S. Pat. Nos. 4,295,756 (Blair) and U.S. Pat. No. 4,367,979 (Milligan) are not directed to an oil boom connector for use in an oil burning environment, and in fact are preferably formed of extruded aluminum, which would begin to melt at approximately 425°-600° C. Oil burning as a method of disposal has thus been less effective because of the absence of a boom connector that could withstand high temperatures while maintaining an effective barrier to the leakage of oil. Furthermore, many known boom connectors were incapable of being reused, because the heat of an oil fire tended to render them inoperable.

The present invention therefore provides an oil containment boom connector that acts as an effective barrier to impede the escape of oil from a surrounded area, even when subjected to the elevated temperatures associated with burning oil. Additionally, the boom connector of the present invention is easy to assemble under adverse ambient conditions.

THE DRAWINGS

The present invention will be further described with reference to the accompanying drawings wherein like reference numerals refer to like parts in the several views, and wherein.

SUMMARY OF THE INVENTION

Figure 1:
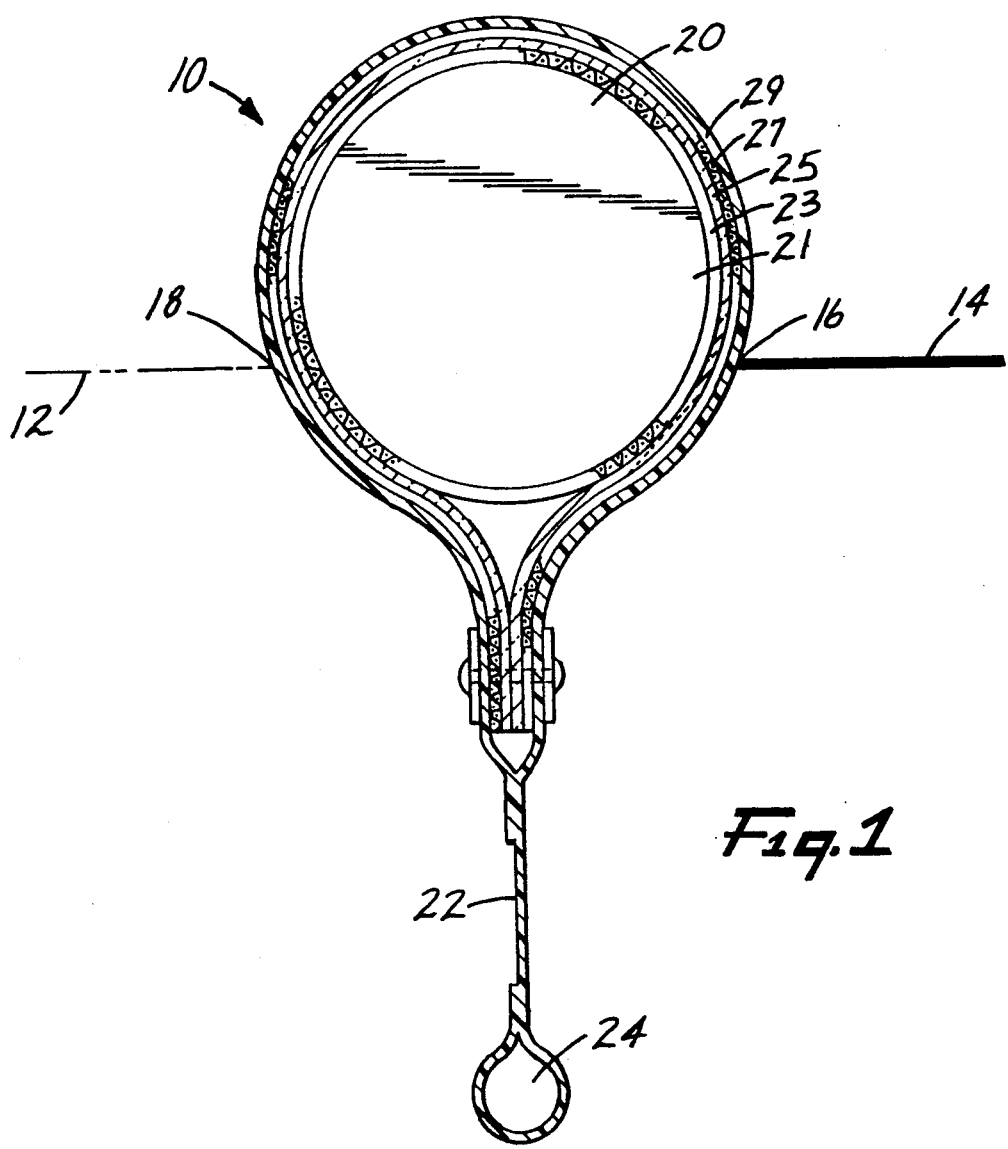
FIG. 1 is a cross-sectional view of a conventional oil containment boom.

The present invention provides a boom connector for connecting an end of a first buoyant oil containment boom to an end of a second buoyant oil containment boom and for providing an effective oil barrier to impede the leakage of oil between a first side of the booms and a second side of the booms. The boom connector includes a first upright connector portion having a base portion securable to the end of the first oil containment boom and projecting from the end, an elbow portion extending from the base portion, an engaging portion having a length extending from the elbow portion generally parallel to and adjacent the base portion, and a slot bounded by the base portion, the elbow portion, and the engaging portion, the slot having a width, the length of the engaging portion substantially greater than the width of the slot. Also provided is a second upright connector portion having a base portion securable to the end of the second oil containment boom and projecting from the end, an elbow portion extending from the base portion, an engaging portion having a length extending from the elbow portion generally parallel to and adjacent the base portion, and a slot bounded by the base portion, the elbow portion, and the engaging portion, the slot having a width, the length of the engaging portion substantially greater than the width of the slot, so that the first connector portion may be interengaged with the second connector portion by positioning the engaging portion of the first connector portion within the slot of the second connector portion, and the engaging portion of the second connector portion within the slot of the first connector portion to connect the first oil containment boom to the second oil containment boom and to create a tortuous path to impede the passage of oil between the first and second connector portions. Further provided are releasable means for preventing unintentional disengagement of the first connector member from the second connector member.

The present invention also provides a connector portion for connecting an end of a first oil containment boom to a like connector portion connected to an end of a second oil containment boom and for cooperatively providing an effective oil barrier to impede the leakage of oil between a first side of the booms and a second side of the booms. The connector portion comprises a base portion securable to the end of the first oil containment boom and projecting from the end, an elbow portion extending from the base portion, an engaging portion having a length extending from the elbow portion generally parallel to and adjacent the base portion, and a slot bounded by the base portion, the elbow portion, and the engaging portion, the slot having a width, the length of the engaging portion substantially greater than the width of the slot. The slot is adapted to receive an engaging portion of a like connector portion and the engaging portion is adapted for positioning within a slot of a like connector portion to connect the first oil containment boom to the second oil containment boom, and to provide a tortuous path to impede the passage of oil between the first side of the booms and the second side of the booms.

Also provided is a method for making a connector portion to connect an end of a first buoyant oil containment boom to an end of a second buoyant oil containment boom having a like connector portion and to provide an effective oil barrier between a first side of the booms and a second side of the booms. The method comprises the steps of a) providing a metal sheet member having an axis that extends longitudinally vertically with respect to the sheet member, b) forming a base portion in the sheet member, the base portion adapted for attachment to an end of an oil containment boom, c) bending the sheet member along a predetermined line that is parallel to the axis to form an elbow portion and an engaging portion, the engaging portion having a length and formed substantially parallel to, adjacent and spaced from the base portion, and a slot bounded by the base portion, the elbow portion, and the engaging portion, the slot having a width, the length of the engaging portion substantially greater than the width of the slot.

The present invention also provides the connector of the present invention in combination with first and second floating oil containment booms.

Also provided is a method of using a connected string of oil containment booms for surrounding oil atop water and for effectively containing the oil during burning. The method comprises a) providing a first buoyant oil containment boom, the boom including a first upright connector portion attached to the boom and constructed of fire resistant material and adapted for interengagement with a cooperative like connector portion, the first upright connector portion comprising a base portion securable to the end of the first oil containment boom and projecting from the end, an elbow portion extending from the base portion, an engaging portion having a length extending from the elbow portion generally parallel to and adjacent the base portion, and a slot bounded by the base portion, the elbow portion, and the engaging portion, the slot having a width, the length of the engaging portion substantially greater than the width of the slot, b) providing a second buoyant oil containment boom, the boom including a second upright connector portion attached to the boom and constructed of fire resistant material and adapted for interengagement with a cooperative like connector portion, the second upright connector portion comprising a base portion securable to the end of the second oil containment boom and projecting from the end, an elbow portion extending from the base portion, an engaging portion having a length extending from the elbow portion generally parallel to the adjacent base portion, and a slot bounded by the base portion, the elbow portion, and the engaging portion, the slot having a width, the length of the engaging portion substantially greater than the width of the slot, c) connecting the first upright connector portion and the second upright connector portion together by inserting the engaging portion of the first connector portion into said slot of the second connector portion, and inserting the engaging portion of the second connector portion into the slot of the first connector portion to connect the oil containment booms and to provide a tortuous path to impede the passage of oil between the first and second connector portions, d) releasably fastening the first connector portion and the second connector portion together using releasable means for preventing unintentional disengagement of the connector portions, e) repeating steps a) through d) for successive adjacent booms in order to form the connected string of oil containment booms, f) surrounding a quantity of floating oil with the connected string of oil containment booms, and g) igniting the oil to permit the dissipation of the oil from the water by combustion.

DETAILED DESCRIPTION OF THE INVENTION

Figure 6:
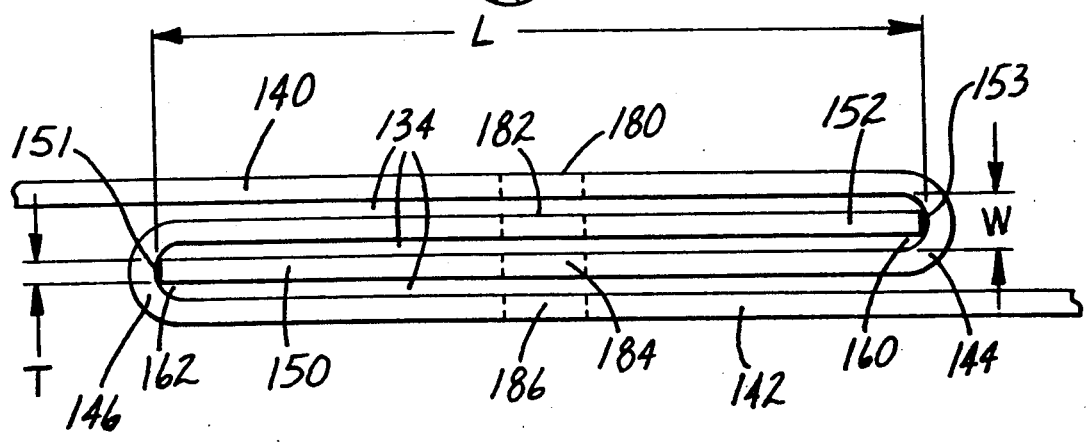
FIG. 6 is an expanded partial top view of the boom connector of the present invention.
Figure 2:
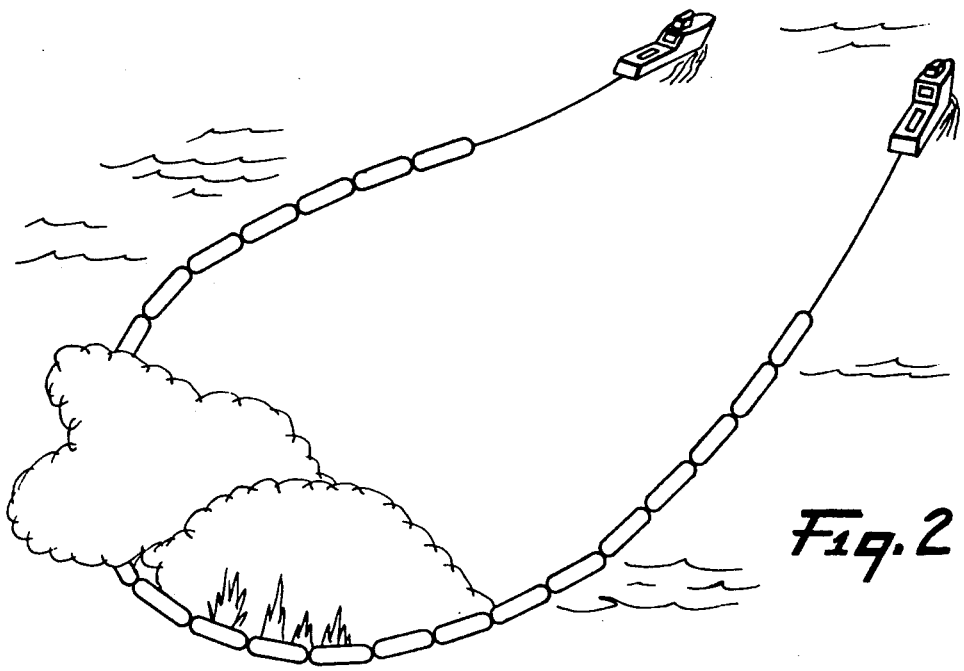
FIG. 2 is an aerial view of two boats towing a string of conventional oil containment booms across a body of water to accumulate oil for collection or disposal.
Figure 3:
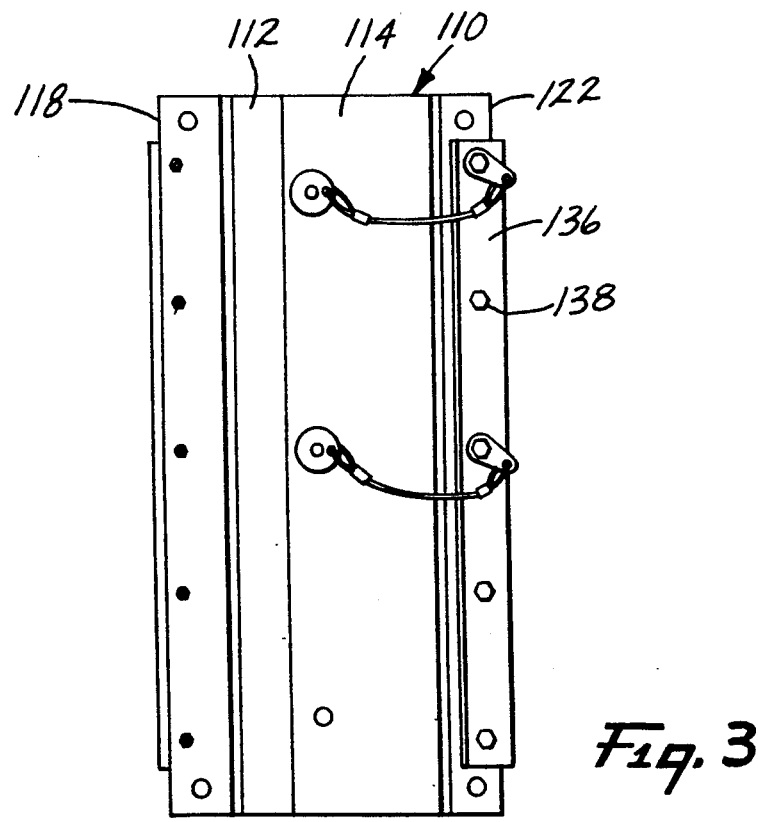
FIG. 3 is a front view of the boom connector of the present invention.
Figure 5:
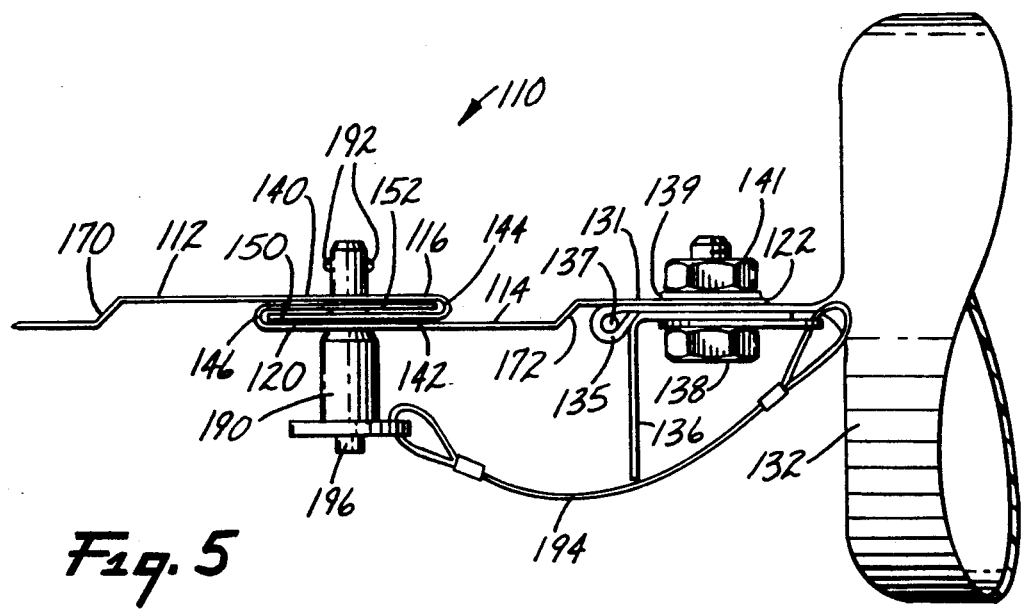
FIG. 5 is a partial top view of the boom connector of the present invention connected on one end to an oil containment boom, shown in the view 5—5 of FIG. 4.
Figure 4:
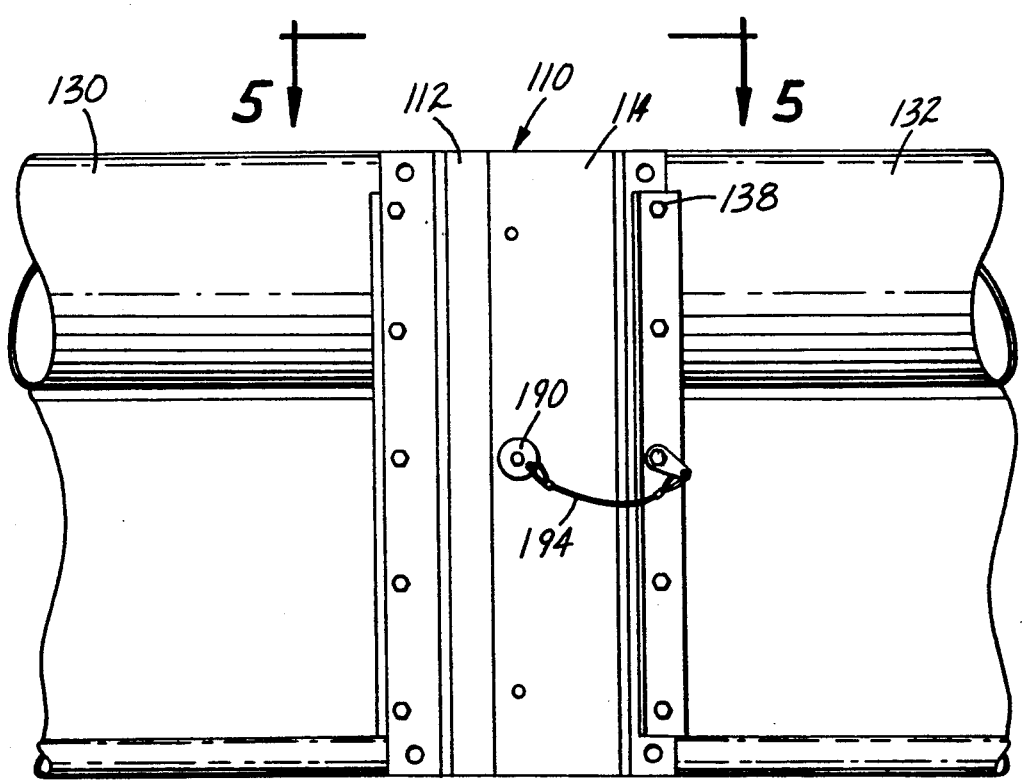
FIG. 4 is a front view of the boom connector of the present invention, connecting two oil containment booms.

The present invention shall be described with reference to the appended drawings, wherein like numbers shall refer to like components throughout. FIGS. 3, 4, 5, and 6 show a fire resistant oil containment boom connector 110 according to the present invention, having cooperating interengaging connector portions 112 and 114. Connector portion 112 has a first end 116 and a second end 118, and connector portion 114 has a first end 120 and a second end 122. First ends 116 and 120 are adapted to interengage as described below, so as to join oil containment booms 130 and 132, as well as to retard or prevent the passage of oil from first side 16 to second side 18 through tortuous path 134. Tortuous path 134, as shown in FIG. 6, is defined by opposing sides of the interengaged base portions, elbow portions, and engaging portions, as described below. Second ends 118 and 122 are attached to containment booms 130 and 132 by retaining the respective boom flaps (represented in FIG. 5 by singular flap 131) between second ends 118 and 122 and attachment means. In the illustrated embodiment, the attachment means includes a plate member 136 which may be of angular cross section to increase the rigidity of the respective connector portions. The attachment means also include one or more threaded bolts 138, which extend through holes (not shown) in the respective plate member, boom flap, and second end, and are secured by washers 139 and threaded nuts 141. In the most preferred embodiment, boom flap 131 is doubled, leaving a cylindrical loop 135, into which a wire rope 137 is inserted and retained, as shown in FIG. 5. Preferably, wire rope 137 is generally equal in height to that of the connector. The attachment means could also be modified to include any other type of fastener or fastening system (e.g. screws, rivets, clamps, or welding).

Connector portions 112 and 114 include base portions 140 and 142 which include second ends 118 and 122. As shown in FIG. 6, elbow portions 144 and 146 extend from base portions 140 and 142, respectively. Variations of elbow portions 144 and 146 include forming them in some other shape, such as a V-shape, U-shape, or square end configuration, or any other equivalent structure. Engaging portions 150 and 152 extend from elbow portions 144 and 146, and are shown in the illustrated embodiment as projecting in substantially parallel relationship to base portions 140 and 142 and toward second ends 118 and 122. However, engaging portions 150 and 152 could also project from elbow portions 144 and 146 at a slight angle with respect to base portions 140 and 142, and such a modification is intended to be within the scope of the present invention. Free edges 151 and 153 define the end of engaging portions 150 and 152, respectively. The distance that the engaging portion projects from the elbow portion toward the second end is the length of the engaging portion, as illustrated in FIG. 6 by length "L". The thickness of the engaging portions is illustrated by thickness "T" in FIG. 6.

Slots 160 and 162 are defined within connector portions 112 and 114, respectively. Slot 160 is bounded by base portion 140, engaging portion 150, and elbow portion 144. Similarly, slot 162 is bounded by base portion 142, engaging portion 152, and elbow portion 146. The maximum distance between the inside edge of the engaging portion and the inside edge of the base portion is the width "W" of the slot, as shown in FIG. 6. The connector portions of the present invention are interengaged by aligning free edge 151 with slot 162, and free edge 153 with slot 160. Second ends 118 and 122 are then pulled in opposite directions, which substantially engages engaging portion 152 in slot 160, and engaging portion 150 in slot 162.

Because boom connectors may have to be manipulated under adverse conditions, as previously discussed, they should be easy to assemble. A further advantage of the present invention is that it may be easily assembled under adverse conditions, which is accomplished in the preferred embodiment by providing slots that are sized to facilitate simplified interengagement of the engaging portions. In the preferred embodiment, the width "W" of the slots is sufficiently greater than the thickness "T" of the engaging portions, so as to permit interengagement of the first and second connector portions without substantial sliding contact between the engaging portions and the slots. In the most preferred embodiment, the width of the slots is equal to twice the thickness "T" of the engaging portions that are to be inserted therein, which allows for easy assembly even under adverse conditions. As explained more fully below, the boom connector of the present invention retains the ability to act as an effective barrier to the leakage of oil, despite the increased clearance between adjacent engaging portions and slots.

Another feature of the present invention is that the interengaged connector portions form a tortuous path 134 that reduces or prevents oil leakage by creating a labyrinthine passage for oil between the surrounded area and the remainder of the body of water. Specifically, the length of engaging portions 150 and 152 is substantially greater than the width of slots 162 and 160, and the lengths of engaging portions 150 and 152 are preferably equal. When the length of engaging portions 150 and 152 is substantially greater than the width of slots 160 and 162, a tortuous path for the escape of oil is provided, and the leakage rate of oil through the boom connector is decreased. Although different ratios of engaging portion length to slot width are contemplated, the most preferred ratio is approximately 5:1. Furthermore, oil flow is preferably attenuated through tortuous path 134 by dimensioning engaging portions 150 and 152 to extend against the inner wall of elbow portions 146 and 144, respectively, as shown in FIG. 6. Thus, in the preferred embodiment, free edge 153 contacts the inner wall of elbow portion 144, and free edge 151 contacts the inner wall of elbow portion 146.

Also provided are offsets 170 and 172, which serve not only to add vertical rigidity to connector portions 112 and 114, but allow for easier coupling thereof. Furthermore, offsets 170 and 172 allow the boom connector to be centered with respect to the boom, which may reduce the stress on portions of the boom connector and the boom. Although shown in FIG. 5 as two approximately 45° angles, these angles may be increased or decreased to alter the position of the engaging portions with respect to the second ends.

Releasable means are also provided for preventing unintentional disengagement of connector portions 112 and 114. In the illustrated embodiment, these means include holes 180, 182, 184, and 186 and releasable pin member 190. Holes 180 and 184 are formed in the base portion and engaging portion, respectively, of connector portion 112, and are in axial alignment with each other. Holes 182 and 186 are formed in the engaging portion and base portion, respectively, of connector portion 114, and are in axial alignment with each other. Thus holes 180, 182, 184, and 186 may be axially aligned when connector portions 112 and 114 are interengaged. Pin member 190 extends through apertures 180, 182, 184, and 186, and includes a pin retainer 192 and quick release mechanism 196 for preventing the accidental removal of pin member 190. Pin member 190 is attached to boom connector 110 by lanyard 194, which is shown as including a stainless steel cord terminating in a loop at each end. One loop is attached to pin member 190, and the other to the boom connector. Lanyard 194 prevents pin member 190 from being accidentally lost during assembly of the connector portions. The boom connector may be held in adjacent relationship using as few as one pin and two holes, although additional holes and pins may be provided as needed. Other releasable means for preventing disengagement are also contemplated, including a bolt and threaded hole or nut arrangement, a cotter pin, a clip, a spring loaded retainer and the like.

In the preferred embodiment, boom connector 110 is formed from a sheet of fire resistant material. As that term is used in connection with this invention, "fire resistant" means that the boom connector is substantially impervious to damage and deformation induced by the elevated temperatures produced by burning oil (i.e. up to approximately 1100° C.), and that the boom connector continues to function as an effective barrier to the leakage of oil and as a boom connector. Damage and deformation include melting, yielding, or buckling or any other response to heat that renders the boom connector unfit for the purposes for which it was designed. Exemplary of a suitable material for the construction of the fire resistant boom connector of the present invention is stainless steel, which is able to withstand temperatures up to and in excess of 1100° C. Stainless steel also is possessed of sufficient strength to withstand the drag forces applied by towing a string of oil containment booms through water. For example, a 20 cm. (8") diameter oil containment boom, sold by 3M Company of St. Paul, Minn., generates a drag force of approximately 680 kgs. per 137 meters of boom length when towed at 16.0 kilometers per hour. A 63.5 cm. high boom connector of the present invention made from 14 gauge (0.2 cm. thick), type 304 stainless steel withstands a force of 2863 kg. before yielding, and is thus an appropriate material from the standpoint of strength. Stainless steel also is resistant to a corrosive, salt water atmosphere, and therefore is ideally suited for oceanic applications, in which oil spills are frequently encountered.

A method is provided for forming the boom connector of the present invention. The preferred method is to construct the boom connector by using a press brake to bend a stainless steel sheet into the desired shape. 14 gauge stainless steel, type 304, which is commonly available, has been shown to be an appropriate material for the present invention, although other materials possessed of suitable properties would also be acceptable. A boom connector of the following approximate dimensions has been shown to have utility. A sheet measuring 12.0 cm. by 63.5 cm. is used to form each of the connector portions, in which the total height of the finished connector portion is 63.5 cm., and the total width is 9.1 cm. The base portions are preferably planar sheet members, as are the engaging portions, which are substantially parallel to the base portions. The base portion, including a 45° offset, measures 8.75 cm. As previously stated, the offset is an optional feature, but lends rigidity to the connector portion. The elbow portion has a 0.2 cm. inside radius 180° bend, which leads to the engaging portion, which measures 2.5 cm. long. Thus the width of the slot, measured from the inside of the base portion to the inside of the engaging portion, is 0.4 cm., which facilitates receipt of the engaging portion or the cooperative engaging portion.

A 54.6 cm. high section of 2.5 cm. by 2.5 cm. stainless steel angle is used to help fasten the oil containment boom to the boom connector. Boom flap 131 is formed in a cylindrical loop running along the height of the connector. Wire rope, preferably stainless steel 0.5 cm. (3/16") diameter, is inserted into the cylindrical loop and retained therein, to prevent the flap from being pulled out after assembly. 1.0 cm. (⅜") diameter bolts are then used with matching washers and nuts to secure the end material of the boom between the connector portion and the angle. Pin member 190 measures 4.8 cm. long overall, and includes a quick release button 191, which allows pin retainers 192 to retract, and pin member 190 to be removed from holes 180, 182, 184, and 186. Both pin member 190 and lanyard 194 are made of stainless steel, and are commonly available from specialty fastener companies, including the Hartwell Corporation, of Rancho Cucamonga, Calif.

Although the present invention has been described with reference to the containment of oil, those skilled in the art will immediately recognize that it is equally applicable to the containment of any floating solid or fluid. For example, the boom connector of the present invention could be used to contain trash, to erect safety barriers, or the like. Thus the scope of the present invention should not be limited to the examples and embodiments disclosed in the specification, but should instead be limited only by the structures presented in the claims, and the equivalents of those structures.

I claim:

1. A boom connector for connecting an end of a first buoyant oil containment boom to an end of a second buoyant oil containment boom and for providing an effective oil barrier to impede the leakage of oil between a first side of the booms and a second side of the booms, said boom connector comprising:

a) a first upright sheet metal connector portion adapted to withstand temperatures in excess of 600° C., and having
a base portion securable to the end of the first oil containment boom and projecting from the end;
an elbow portion extending from said base portion;
an engaging portion having a length extending from said elbow portion generally parallel to and adjacent said base portion; and
a slot bounded by said base portion, said elbow portion, and said engaging portion, said slot having a width, said length of said engaging portion substantially greater than said width of said slot;

b) a second upright sheet metal connector portion adapted to withstand temperatures in excess of 600° C., and having
a base portion securable to the end of the second oil containment boom and projecting from the end;
an elbow portion extending from said base portion;
an engaging portion having a length extending from said elbow portion generally parallel to and adjacent said base portion; and
a slot bounded by said base portion, said elbow portion, and said engaging portion, said slot having a width, said length of said engaging portion substantially greater than said width of said slot;

so that said first connector portion may be interengaged with said second connector portion by positioning said engaging portion of said first connector portion within said slot of said second connector portion, and said engaging portion of said second connector portion within said slot of said first connector portion to connect the first oil containment boom to the second oil containment boom and to create a tortuous path to impede the passage of oil between said first and second connector portions; and c) releasable means for preventing unintentional disengagement of said first connector member from said second connector member.

2. The boom connector of claim 1, wherein said releasable means comprises at least one set of holes and at least one pin member, said set of holes including one hole formed in said base portion and one hole formed in said engaging portion of said first connector portion and one hole formed in said base portion and one hole formed in said engaging portion of said second connector portion, wherein said set of holes may be axially aligned when said connector portions are interengaged to facilitate insertion of the pin member therethrough.

3. The boom connector of claim 1, wherein the length of said engaging portion of said first connector portion is approximately five times greater than said width of said slot of said second connector portion.

4. The boom connector of claim 1, wherein the width of said slots is sufficiently greater than the thickness of said engaging portions so as to permit interengagement of said connector portions without substantial sliding contact between said engaging portions and said slots.

5. The boom connector of claim 1, wherein the width of said slot of said first connector portion is approximately two times greater than the thickness of said engaging portion of said second connector portion.

6. The boom connector of claim 1, wherein said first and second connector portions are substantially identical.

7. The connector of claim 1, wherein said base portions and said engaging portions are each generally planar.

8. A sheet metal connector portion for connecting an end of a first oil containment boom to a like connector portion connected to an end of a second oil containment boom and for cooperatively providing an effective oil barrier to impede the leakage of oil between a first side of the booms and a second side of the booms, the connector portion adapted to withstand temperatures in excess of 600° C. and comprising:
a base portion securable to the end of the first oil containment boom and projecting from the end;
an elbow portion extending from said base portion;
an engaging portion having a length extending from said elbow portion generally parallel to and adjacent said base portion; and
a slot bounded by said base portion, said elbow portion, and said engaging portion, said slot having a width, said length of said engaging portion substantially greater than said width of said slot;
said slot adapted to receive an engaging portion of a like connector portion and said engaging portion adapted for positioning within a slot of a like connector portion to connect the first oil containment boom to the second oil containment boom, and to provide a tortuous path to impede the passage of oil between the first side of the booms and the second side of the booms.

9. In combination:
(a) a first floating oil containment boom;
(b) a second floating oil containment boom; and
(c) a boom connector for connecting said first and second booms and for providing an effective oil barrier to impede the leakage of oil between a first side of the booms and a second side of the booms, said boom connector including:
  i) a first upright sheet metal connector portion adapted to withstand temperatures in excess of 600° C., and having:
    a base portion securable to the end of the first oil containment boom and projecting from the end;
    an elbow portion extending from said base portion;
    an engaging portion having a length extending from said elbow portion generally parallel to and adjacent said base portion; and
    a slot bounded by said base portion, said elbow portion, and said engaging portion, said slot having a width, said length of said engaging portion substantially greater than said width of said slot;
  ii) a second upright sheet metal connector portion adapted to withstand temperatures in excess of 600° C., and having:
    a base portion securable to the end of the second oil containment boom and projecting from the end;
    an elbow portion extending from said base portion;
    an engaging portion having a length extending from said elbow portion generally parallel to and adjacent said base portion; and
    a slot bounded by said base portion, said elbow portion, and said engaging portion, said slot having a width, said length of said engaging portion substantially greater than said width of said slot;
  so that said first connector portion may be interengaged with said second connector portion by positioning said engaging portion of said first connector portion within said slot of said second connector portion, and said engaging portion of said second connector portion within said slot of said first connector portion to connect the first oil containment boom to the second oil containment boom and to create a tortuous path to impede the passage of oil between said first and second connector portions; and
(d) releasable means for preventing unintentional disengagement of said first connector member from said second connector member.

10. The combination of claim 9, wherein said releasable means of element d) comprises at least one set of holes and at least one pin member, said set of holes including one hole formed in said base portion and one hole formed in said engaging portion of said first connector portion and one hole formed in said base portion and one hole formed in said engaging portion of said second connector portion, wherein said set of holes may be axially aligned when said connector portions are interengaged to facilitate insertion of the pin member therethrough.

11. The combination of claim 9, wherein said boom connector is constructed of a material that is fire resistant.

12. The combination of claim 9, wherein the length of said engaging portion of said first connector portion is approximately five times greater than the width of said slot of said second connector portion.

13. The combination of claim 9, wherein the width of said slots is sufficiently greater than the thickness of said engaging portions so as to permit interengagement of the connector portions without substantial sliding contact between said engaging portions and adjacent slots.

14. The combination of claim 9, wherein the width of at least one slot is approximately two times greater than the thickness of a cooperative engaging portion.

15. The combination of claim 9, wherein said first and second connector portions are substantially identical.

16. A method of using a connected string of oil containment booms for surrounding oil atop water and for effectively containing the oil during burning, the method comprising:
a) providing a first buoyant oil containment boom, said boom including a first upright sheet metal connector portion attached to the boom and adapted to withstand temperatures in excess of 600° C., and further adapted for interengagement with a cooperative like connector portion, said first upright connector portion comprising:
  a base portion securable to the end of the first oil containment boom and projecting from the end;
  an elbow portion extending from said base portion;
  an engaging portion having a length extending from said elbow portion generally parallel to and adjacent said base portion; and
  a slot bounded by said base portion, said elbow portion, and said engaging portion, said slot having a width, said length of said engaging portion substantially greater than said width of said slot;
b) providing a second buoyant oil containment boom, said boom including a second upright sheet metal connector portion attached to the boom and adapted to withstand temperatures in excess of 600° C., and further adapted for interengagement with a cooperative like connector portion, said second upright connector portion comprising:
  a base portion securable to the end of the second oil containment boom and projecting from the end;
  an elbow portion extending from said base portion;
  an engaging portion having a length extending from said elbow portion generally parallel to said adjacent base portion; and
  a slot bounded by said base portion, said elbow portion, and said engaging portion, said slot having a width, said length of said engaging portion substantially greater than said width of said slot;
c) connecting said first upright connector portion and said second upright connector portion together by inserting said engaging portion of said first connector portion into said slot of said second connector portion, and inserting said engaging portion of said second connector portion into said slot of said first connector portion to connect the oil containment booms and to provide a tortuous path to impede the passage of oil between said first and second connector portions;
d) releasably fastening said first connector portion and said second connector portion together using releasable means for preventing unintentional disengagement of said connector portions;

e) repeating steps a) through d) for successive adjacent booms in order to form the connected string of oil containment booms;

f) surrounding a quantity of floating oil with the connected string of oil containment booms; and g) igniting said oil to permit the dissipation of said oil from the water by combustion.

17. The method of claim 16, wherein step a) and b) comprise providing oil containment booms including substantially identical first and second upright connector portions.

18. The method of claim 16, wherein step f) includes surrounding a quantity of floating oil with a connected string of oil containment booms using two watercraft, the first watercraft towing one end of the connected string across a body of water and the second watercraft towing the other end of the connected string in a substantially parallel direction with respect to said first watercraft across a body of water to form a loop having a closed end to surround and contain said oil.

* * * * *